United States Patent [19]

Piao

[11] Patent Number: 4,951,915

[45] Date of Patent: Aug. 28, 1990

[54] ELECTRONIC WATER FLOW CONTROL DEVICE

[76] Inventor: Lin C. Piao, 4F, No. 330, Chung Yang N. Rd., Sec. 4, Pei Tou, Taipei, Taiwan

[21] Appl. No.: 463,209

[22] Filed: Jan. 10, 1990

[51] Int. Cl.$^5$ .................... F16K 31/04; F16K 31/16; F16K 31/54

[52] U.S. Cl. ..................... 251/14; 74/89.17; 74/107; 74/479; 251/129.03; 251/129.04; 251/129.12; 251/250; 251/251; 307/66; 320/61; 322/35

[58] Field of Search ............... 74/56, 57, 89.17, 107, 74/421 A, 422, 479, 625; 251/14, 129.03, 129.04, 129.12, 129.13, 250, 251, 252, 253, 254, 255, 263; 307/66; 320/61; 322/35

[56] References Cited

U.S. PATENT DOCUMENTS

| | | | |
|---|---|---|---|
| 4,122,381 | 10/1978 | Sturm | 320/61 |
| 4,370,631 | 1/1983 | Gerber et al. | 251/129.13 |
| 4,428,398 | 1/1984 | Mito et al. | 251/129.13 |
| 4,535,813 | 8/1985 | Spain | 251/250 |
| 4,779,839 | 10/1988 | Sears | 251/129.04 |
| 4,838,310 | 6/1989 | Scott et al. | 251/129.04 |

*Primary Examiner*—George L. Walton
*Attorney, Agent, or Firm*—Lowe, Price, LaBlanc, Becker & Shur

[57] ABSTRACT

An electronic water flow control device, which includes a mini-scale electrical generator which changes the mechanical energy from water flow into electrical energy for storage in a battery and for further use in driving a motor, by means of the control of a control circuit, to carry a piston rod to move forward or backward through the operation of a speed reducing gear set, so as to push a ball valve away from a water inlet for the passing therethrough of water flow or permit such a ball valve to block up the water inlet.

6 Claims, 3 Drawing Sheets

1

ELECTRONIC WATER FLOW CONTROL DEVICE

BACKGROUND OF THE INVENTION

The present invention is related to an electronic water flow control device which is controlled to operate by means of a control circuit with self-provided electric power which is obtained from water power generation.

The water flow control device which is commonly called water tap or faucet is used for starting or stopping the flow of water in a pipe or barrel. Conventionally, a water flow control device is operated through swiveling or pressing control to turn on or off the valve therein so as to start or stop the flow of water. Recently, various types of infrared induced automatic water flow control devices have been developed to satisfy consumers' demand for high quality and high performance. A common disadvantage of the existing infrared induced automatic water flow control devices is their high cost. Another common disadvantage of the existing infrared induced automatic water flow control devices is the limitation of the availability of AC power supply.

An object of the present invention is to provide an electronic water flow control device which can change mechanical energy from the flow of water into electrical energy for storage in a battery for further use in the operation of a motor and a detector.

Another object of the present invention is to provide an electronic water flow control device which utilizes compression springs to reserve mechanical energy for use in controlling the movement of a piston rod which pushes a ball valve to move away from a water inlet and permits such a ball valve to block up such a water inlet.

SUMMARY OF THE INVENTION

In an embodiment of the present invention, an electronic water flow control device utilizes water pressure to push an axle to drive a movable ring via a lever to compress a spring for energy reservation. The reserved energy is utilized to drive a piston rod, which is driven to push a ball valve away from a water inlet, to move back to original position, A mini-scale electrical generator is placed in the device with its fan blade portion disposed in the water outlet therein so that the mechanical energy from the flow of water can be changed into electrical energy for the storage in a battery after through the treatment of voltage rectification and stabilization. The electric energy in the battery is utilized to drive the device to start or stop the flow of water automatically.

In an alternate form of the present invention, a speed reducing gear set and a cam wheel are provided to control the motion of a piston rod so as to further push a ball valve away from a water inlet or permit such a ball valve to block up such a water inlet. By means of an integrated control circuit, the period for the passing of water flow through the water inlet is automatically controlled.

DETAILED DESCRIPTION OF THE PREFERRED EMBODIMENTS

Figure 1:
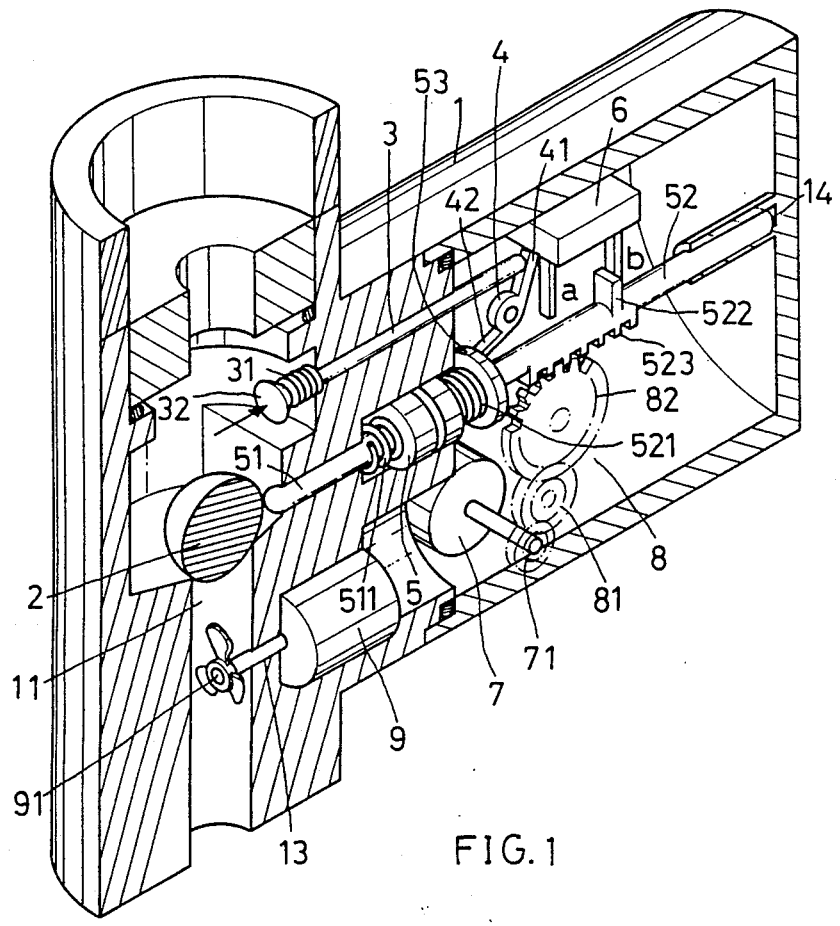
FIG. 1 is a perspective sectional view of an electronic water flow control device in accordance with the present invention.
Figure 2:
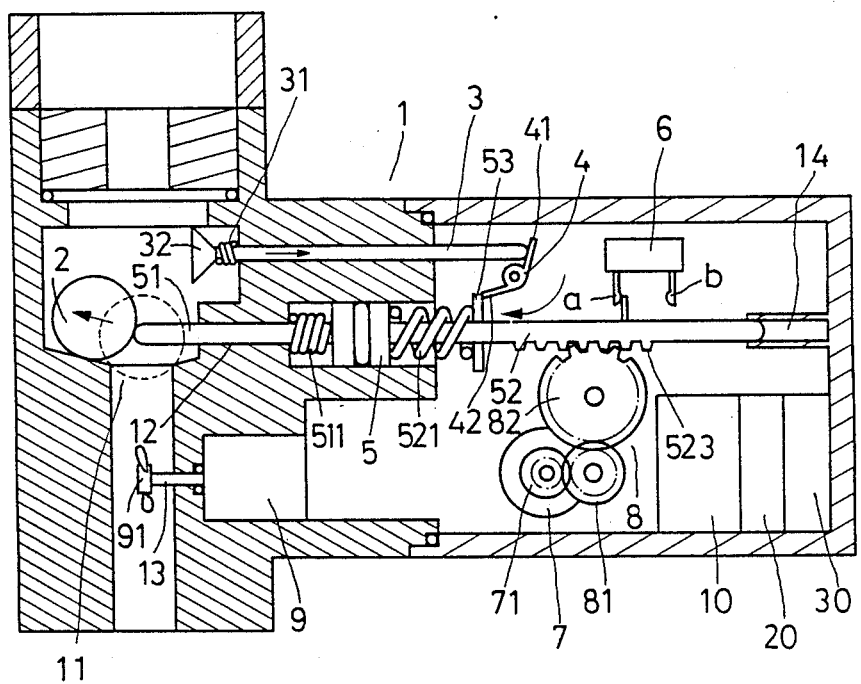
FIG. 2 is a schematic plan view illustrating the operation of the inner parts of the electronic water flow control device of FIG. 1.

Referring to FIGS. 1 and 2, there is shown an embodiment of electronic water flow control device in accordance with the present invention, which is generally comprised of a housing (1), a ball valve (2), an axle (3), a lever (4), a piston rod (5), a switch (6), a motor (7), a speed reducing gear set (8), a coil type mini-scale electrical generator (9), a control circuit (10), a rechargeable battery (20), and a detector (30).

The housing (1) comprises a plurality of throughholes for the insertion therein of the axle (3), the piston rod (5), and the shaft of motor (7). A water inlet (11) is made on the housing (1) for the setting therein of the ball valve (2) permitting the left-hand part (51) of piston rod (5) to contact the ball valve (2). Two springs (511) and (521) are mounted on the piston rod (5) at its left-hand part (51) and right-hand part (52) respectively. The right-hand spring (521) is positioned by means of a movable ring (53) which is stopped by a lower extension end (42) of the lever (4). The lever (4) comprises an upper extension end (41) opposite to its lower extension end (42) and constantly pressed by the axle (3). The other end of the axle (3) which is opposite to the upper extension end (41) of the lever (4) is a horn-shaped portion (32) having a spring (31) thereon at its inner side. Upon striking of water pressure on the horn-shaped portion (32) to compress the spring (31), the axle (3) is forced to push the lever (4). The piston rod (5) comprises a projection (522) upstanding from its right-hand part (52) to alternatively match with the two terminals (a) and (b) of the switch (6), and a rack (523) incorporated therewith at a lower position on its right-hand part (52) and engaged with a big gear (82) of the speed reducing gear set (8). The big gear (82) is connected to a pinion (71) via an idle pulley (81), which pinion is mounted on the revolving shaft of the motor (7). The end portion of the right-hand part (52) of the piston rod (5) is inserted in a hollow pillar (14) which is internally made on the housing (1). The coil type mini-scale electrical generator (9) comprises a fan blade portion (91) disposed in a water outlet communicating with the water inlet (11). By means of water flow, the fan blade portion (91) can be turned to rotate so that the electrical generator (9) can change the mechanical energy into an electrical energy. Through rectification and voltage stabilizing process, the electrical energy is reserved in the battery (20). The control circuit (10) is to control the motor (7) to rotate, so as to further turn on/off water supply. The detector (30) is to detect the position of the projection (522) of the piston rod (5) relative to the terminals (a) and (b) of the switch (6), so as to provide the control circuit (10) with a signal to turn on/off the motor (7).

The electronic water flow control device of the present invention utilizes water pressure to push the horn-shaped portion (32) to squeeze the upper spring (31) thereon so as to drive the axle (3) to push the upper extension end (41) of the lever (4) permitting the lower extension end (42) of the lever (4) to force the movable ring (53) to squeeze the right-hand spring (521) on the right-hand part (52) of the piston rod (5) for energy reservation. The electronic water flow control device of the present invention also utilizes its piston rod (5) to squeeze the left-hand spring (511) to reserve energy for pushing the piston rod (5) to move back when the piston rod (5) is forced to push the ball valve (2). Water pressure is also utilized to turn the fan blade (91) so as to drive the electrical generator (9) to change the mechanical energy into electrical energy for further treatment through voltage rectification and stabilization process and for further storage in the battery (20).

As soon as an ON signal is given to the control circuit (10) during the operation, the circuit (10) instructs the motor (7) to drive the piston rod (5) to displace via the speed reducing gear set. During (511) is squeezed to reserve mechanical energy, and the left-hand part (51) of the piston rod (5) pushes the ball valve (2) away from the water inlet (11) for the passing therethrough of water. As soon as the device turns on its water inlet (11), the projection (522) of the piston rod (5) is moved to contact the left terminal (a). The connection of the projection (522) to the left terminal (a) is detected by the detector (30) which immediately provides a signal to the control circuit (10) to stop the operation of the motor (7). As soon as the control circuit (10) is induced again, it immediately instructs the motor (7) to rotate, and the piston rod (5) is simultaneously pushed to move back to original position by means of the release of mechanical energy from the left-hand spring (511) and the driving of the speed reducing gear set (8) through its rack portion (523). Upon retreat of the piston rod (5), the ball valve (2) moves back to block up the water inlet (11) again, and the projection (522) is simultaneously shifted from the left terminal (a) to the right terminal (b). The connection of the projection (522) with the right terminal (b) is simultaneously detected by the detector (30) which immediately provides the control circuit (10) with a signal to stop the rotation of the motor (7). Therefore, the water flow is completely blocked up.

The right-hand spring (521) of the piston rod (5) is constantly squeezed by the movable ring (53) to reserve mechanical energy. By means of the effect of water pressure, the right-hand spring (521) and the speed reducing gear set (8), the piston rod (5) can be efficiently driven to push the ball valve (2) away from the water inlet (11) so that water flow can be turned on with minimized power consumption.

When the ball valve (2) is in an open status, the left-hand spring (511) is squeezed to reserve mechanical energy. Therefore, by means of the release of mechanical energy from the left-hand spring (511) and the operation of the speed reducing gear set (8), the piston rod (5) can be driven to move back to original position with minimized power consumption, permitting the ball valve (2) to block up the water inlet (11) again.

Figure 3:
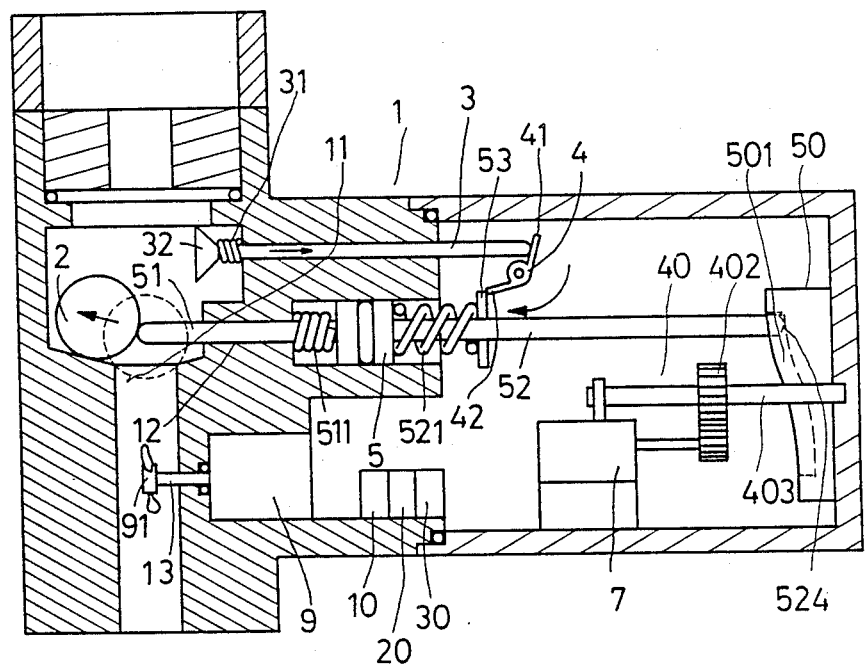
FIG. 3 is a schematic plan view of another embodiment of electronic water flow control device according to the present invention.

Referring to FIG. 3, therein illustrated is an alternate form of the present invention. In this embodiment, there is a speed reducing gear set (40) which comprises a big gear (402) having its gear shaft (403) secured to a cam wheel (50). The cam wheel (50) comprises a slide way (501) defining an upper limit and a lower limit. There is a piston rod (52) having its head (524) secured to the slide way (501) of the cam wheel. During the rotation of the cam wheel (50), the piston rod (52) is simultaneously carried to push a ball valve (2) to move away or toward a water inlet (11) so as to control water flow.

In conclusion, the present invention is to provide an electronic water flow control device which can automatically change the mechanical energy obtained from water flow into electrical energy for driving the motor thereof, by means of the control of an integrated circuit, to efficiently control the water flow passing therethrough. The present invention is very practical for use in regular water tap, automatic field water sprayer, and motorized water reservoir, .. etc.

I claim:

1. An electronic water flow control device, including:

a housing defining therein a water inlet:

a ball valve releasably set to block up said water inlet;

a fluid axle actuator having a horn-shaped front end disposed in said water inlet at an upper position, and a compression spring thereon at the inner side of its horn-shaped front end, said horn-shaped front end being movable in response to water pressure within said water inlet;

a lever comprising an upper extension end and a lower extension end;

a piston rod comprising a left-hand part driven to push said ball valve away from said water inlet, said left-hand part having a compression spring mounted thereon, and a right-hand part with a compression spring mounted thereon and squeezed by a movable ring which is stopped by said lower extension end of said lever, said right-hand part comprising an upper projection and a lower rack portion; a switch having two terminals alternatively connected with said upper projection of said piston rod; said axle being movable into engagement with said upper extension end when said water pressure moves said axle to permit said lower extension end to engage said movable ring to compress said piston compression springs to move said piston rod downwardly to push said ball valve away from said water inlet to allow water therethrough, whereby upon a reduction in said water pressure within said water inlet said axle compression spring will permit said axle to disengage from said upper extension end to allow said piston compression springs to move said movable ring against said lower extension end to move said piston rod away from said ball valve so that said water pressure in said water inlet will move said ball valve to block off the water flow through said water inlet; said flow control device further including an alternative actuator which comprises:

a motor set to drive said piston rod to move forward and backward by means of a gear set which is engaged with said lower rack portion of said piston rod, so as to drive said ball valve to open or close said water inlet;

a control circuit to control the operation of said motor; and a detector to detect the position of said upper projection relative to the two terminals of said switch so as to provide said control circuit with a corresponding signal for controlling the operation of said motor.

2. An electronic water flow control device according to claim 1, wherein the compression spring on said right-hand part of said piston rod is squeezed to reserve energy when said piston rod is driven to push said ball valve away from said water inlet, so that said piston rod can be efficiently driven by said speed reducing gear set to move back with minimized power consumption upon the release of the energy from the compression spring on said right-hand part.

3. An electronic water flow control device according to claim 1, wherein the compression spring on said left-hand part of said piston rod is squeezed to reserve energy when said piston rod is driven to push said ball valve away from said water inlet, and it releases its reserved energy permitting said piston rod to be carried by said speed reducing gear set to move back to original position with minimized power consumption.

4. An electronic water flow control device according to claim 1, wherein a coil type mini-scale electrical generator is set in said housing with its fan blade portion disposed in a water outlet so as to change mechanical energy from the water flow which passes thereby to electrical energy for the storage in a battery for use to drive the device to operate.

5. An electronic water flow control device according to claim 1, wherein said piston rod is driven to move forward and backward by a speed reducing gear via a cam wheel so as to drive said ball valve to move away from or to block up said water inlet.

6. An electronic water flow control device according to claim 5, wherein said speed reducing gear set comprises a big gear having its gear shaft secured to said cam wheel which comprises a slide way on its face for the connection thereto of the head of said piston rod, so that said piston rod can be driven by said speed reducing gear set can drive via said cam wheel to push said ball valve away from said water inlet or to move away from said ball valve permitting said ball valve to block up said water inlet.

* * * * *